United States Patent [19]
De Garcia, Jr. et al.

[11] 3,835,643
[45] Sept. 17, 1974

[54] NESTED TOROID NOZZLE APPARATUS

[75] Inventors: Horacio J. De Garcia, Jr., Maryland Heights; Vincent H. Zimmerman, Olivette, both of Mo.

[73] Assignee: McDonnell Douglas Corporation, St. Louis, Mo.

[22] Filed: Nov. 21, 1972

[21] Appl. No.: 308,533

[52] U.S. Cl. ............... 60/230, 60/232, 60/39.43, 239/265.25, 244/12 D, 239/265.35, 244/23 D
[51] Int. Cl. ............... F02k 1/20, B64c 15/08
[58] Field of Search ...... 60/232, 230, 226 A, 226 R, 60/262, 263, 39.43; 239/265.33, 265.35, 265.25; 417/408; 244/12 D, 23 A, 23 B, 23 D; 115/12 A, 12 R

[56] References Cited
UNITED STATES PATENTS

| | | | |
|---|---|---|---|
| 3,178,887 | 4/1965 | Wilde et al. | 60/232 X |
| 3,192,715 | 7/1965 | Engel et al. | 60/232 |
| 3,241,312 | 3/1966 | Clark | 244/23 D |
| 3,327,480 | 6/1967 | Gunter | 239/265.35 |
| 3,400,540 | 9/1968 | Cresswell et al. | 239/265.35 |
| 3,490,236 | 1/1970 | Markowski | 60/232 |
| 3,527,408 | 9/1970 | Markowski | 239/265.27 |

FOREIGN PATENTS OR APPLICATIONS

| | | | |
|---|---|---|---|
| 1,150,879 | 6/1963 | Germany | 60/232 |
| 747,772 | 12/1966 | Canada | 244/12 D |
| 1,279,495 | 11/1960 | France | 60/230 |
| 1,375,436 | 11/1963 | France | 244/12 D |

OTHER PUBLICATIONS

Solid Propellant Motors, Flight, Jan. 13, 1961, p. 42.

*Primary Examiner*—Carlton R. Croyle
*Assistant Examiner*—Robert E. Garrett
*Attorney, Agent, or Firm*—Gravely, Lieder & Woodruff

[57] ABSTRACT

A nested toroid nozzle apparatus for vertical or short takeoff aircraft in which the source of power may be a turbofan, turbotip fan, or turbojet engine thrust unit housed in an aerodynamically clean nacelle. The nacelle also carries the nozzle components making it possible to integrate the continuity of lift and cruise thrust throughout the range required to convert from vertical lift to forward acceleration and into cruise flight. The nozzle components provide a close coupling between the thrust fan plane and the centerline of the downwardly vectored thrust. The nozzle components have a toroidal shape for maximum nozzle efficiency, compactness and lightweight, assumption of primary thrust loads in hoop tension, and diffuser designed for minimum pressure losses during the vectored lift mode and conventional cruise mode.

18 Claims, 6 Drawing Figures

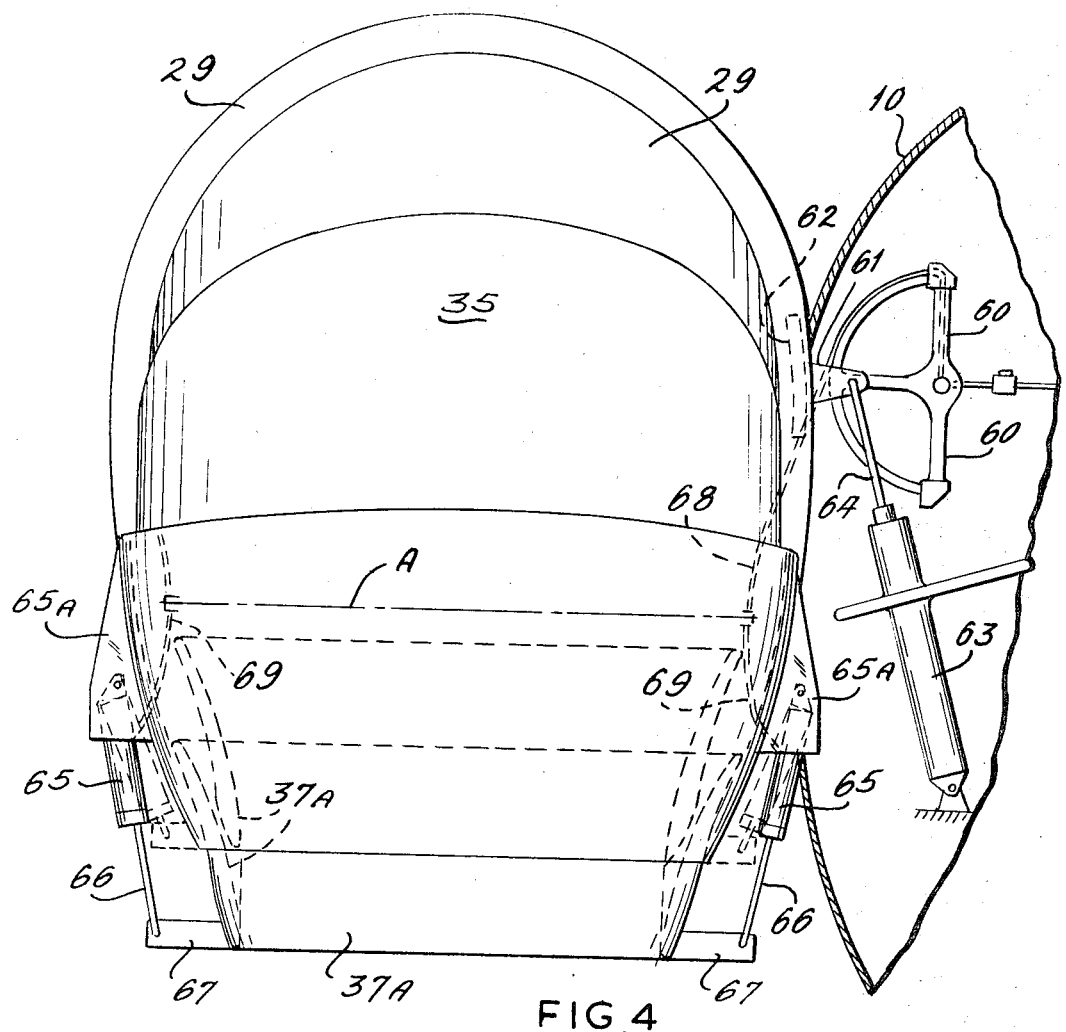
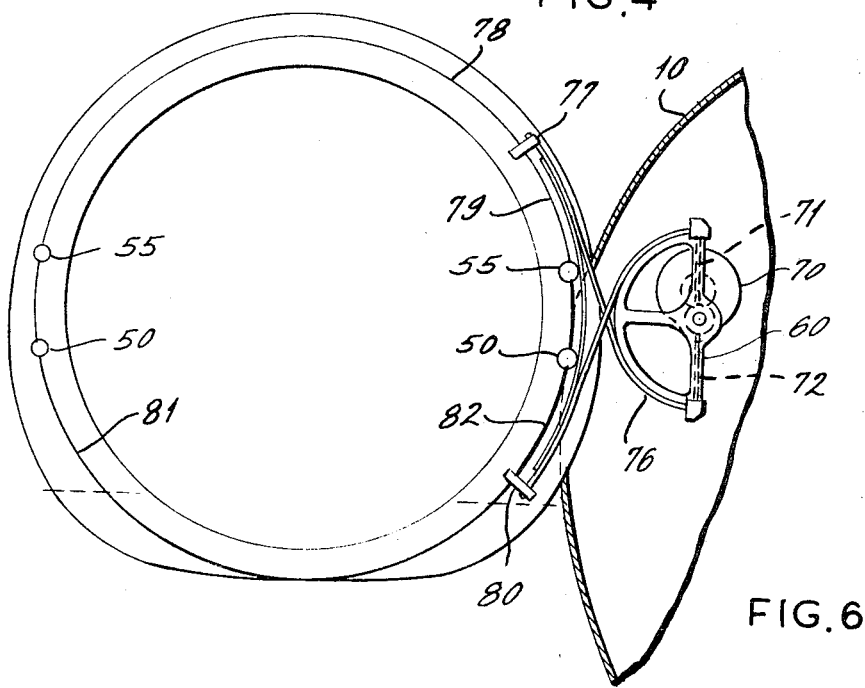

NESTED TOROID NOZZLE APPARATUS

BACKGROUND OF THE DISCLOSURE

The design of a V/STOL aircraft propulsion system requires the assessment of several key design considerations in order to obtain the best overall airframe to propulsion combination. One of these considerations is that the basic propulsion system be designed to perform not only the lift but also the control and cruise functions. Propulsion efficiency is significant in the operation of the V/STOL aircraft because the thrust required is greater than aircraft weight for vertical takeoff. The thrust-to-weight is approximately three times that required for conventional subsonic aircraft that use long runways for takeoff. This need for efficiency can be partially fulfilled by utilizing common propulsion components for both lift and cruise functions. To accomplish this a compact, lightweight thrust vectoring assembly is necessary to provide efficient operation in the lift as well as in cruise operation. Continuous, uninterrupted vectoring of thrust is required throughout the 9ange needed to provide lift for the V/STOL mode, thrust for the cruise mode, and also thrust at the various deflection angles required to accomplish transition to and from conventional flight.

SUMMARY OF THE INVENTION

This invention relates to a nested toroid nozzle apparatus.

The nozzle apparatus fulfills the need for efficient uninterrupted vectoring of thrust for vertical or short takeoff aircraft (V/STOL). The nested toroid nozzle components permit realization of optimum efficiency by making it possible to integrate the lift ]nd cruise propulsion modes through use of the same thrust unit.

It is an object of the invention to provide a thrust vectoring nozzle apparatus having a compactness for obtaining close coupling between the plane of the fan or rotor and the centerline of the vectored thrust.

It is also an object of the invention to employ a toroidal nozzle configuration to provide maximum nozzle propulsive and structural efficiency.

Other objects of the invention are to provide a compact and lightweight integration of nozzle components into a clean nacelle, to provide a diffuser configuration which minimizes pressure losses during the vectored operational mode for lift and in conventional cruise mode, and to provide the nozzle components for sustaining internal pressures in hoop tension.

Still another object of the invention is to provide a nested toroid nozzle apparatus in which a novel gullet component is incorporated for permitting rotation of the hoods about an axis or hinge line that is within the outline of the assembly, rather than about an external axis or hinge line.

A preferred embodiment of the nozzle structure consists of movable hood members arranged to pivot on a hinge axis located within the body of the nacelle. The hood members are generally circular shaped sections that fit snugly within each other such that the extension or retraction travel is through an arc smaller than the diameter of the assembly. The circular shape of the hood members provides excellent internal flow characteristics and provides a hoop tension internal pressure load path for exceptional strength and lightweight. The nozzle bucket member is a toroid with the exit plane being essentially circular for efficient nozzle function. In this assembly the gullet is an important component as it permits the nested toroid components to travel on an extremely short arc. The gullet is a simple internal liner structure that moves so as to allow the nozzle bucket member to pivot without spoiling the flow. The gullet therefore acts to streamline the space about the hinge axis by having resilient fingers or strips that expand or overlap for accommodating the positions of the hoods and nozzle bucket. Thus the efficiency of the assembly is greatly improved.

Also, the preferred embodiment includes internally shaping the movable hood members to provide an efficient diffuser which minimizes internal pressure losses consistent with good performance, thus avoiding excessive length which could increase drag and even create flow disturbances that would further reduce the net thrust available. For hover (zero velocity flight), transition, and conversion to conventional aerodynamic flight, the present embodiment will provide 90° of thrust vectoring for lift and then can be moved into substantially straight aft thrust vectoring for cruise flight. In addition, a vector angle greater than 90°, or an angle of 135° or more, can be achieved for control and reverse thrust conditions for inflight approach-landing, and deceleration during landing. Still further, the hood assembly can be rotated laterally relative to the thrust axis of the fan in the nacelle for aircraft yaw control.

BRIEF DESCRIPTION OF THE DRAWINGS

In the accompanying drawings of the presently preferred embodiment,

FIG. 4 is a fragmentary and schematic view of the nozzle and fuselage looking forward from the rear in FIG. 1, and in which view the components of the improved nozzle assembly are positioned for vectored thrust in hovering;

FIG. 6 is a further schematic view of the control system for adjusting the nozzle components into and between the positions seen in FIGS. 2 and 5.

DESCRIPTION OF THE NOZZLE APPARATUS

Figure 1:
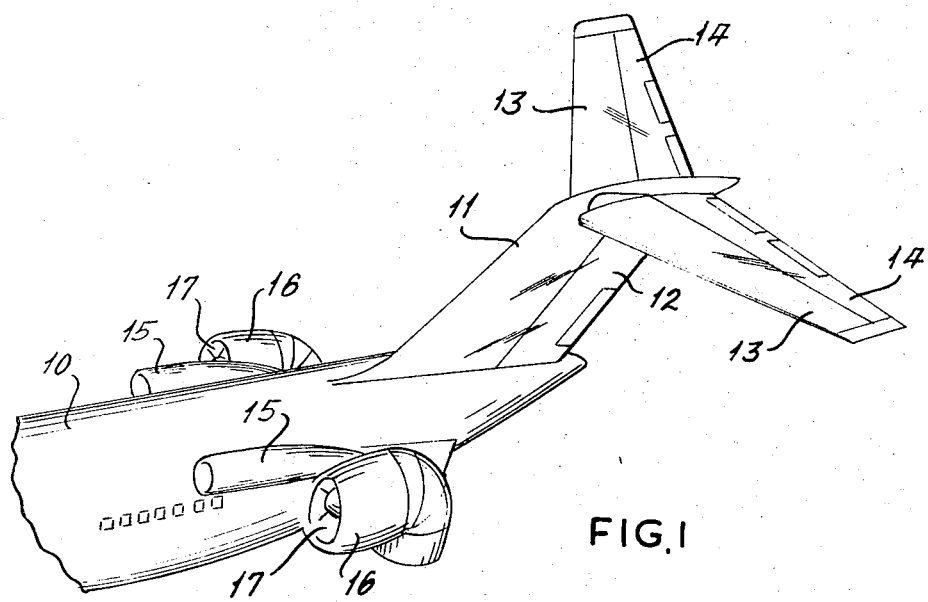
FIG. 1 is a fragmentary perspective view of the tail and aft fuselage portions of a typical aircraft equipped with the improved nozzle assemblies of this invention, although this disclosure does not exclude the use of the present improvements in other arrangements.

Referring now to the drawings, FIG. 1 is a perspective view of one typical installation of the present nozzle assembly when applied to the aft fuselage section of an aircraft of the V/STOL character, the rest of the aircraft not being necessary to show for present purposes of disclosure. In this view the fuselage 10 is provided with a vertical stabilizer 11 on which the rudder 12 is hingedly mounted. The stabilizer 11 carries horizontal stabilizer surfaces 13 on which the elevator surfaces 14 are hinged. The fuselage section 10 carries a pair of jet engines 15. Each engine has its exhaust connected into the adjacent nacelle 16 which houses a turbotip fan driven by the jet exhaust to induct the ambient air through the nacelle inlet 17.

Figure 2:
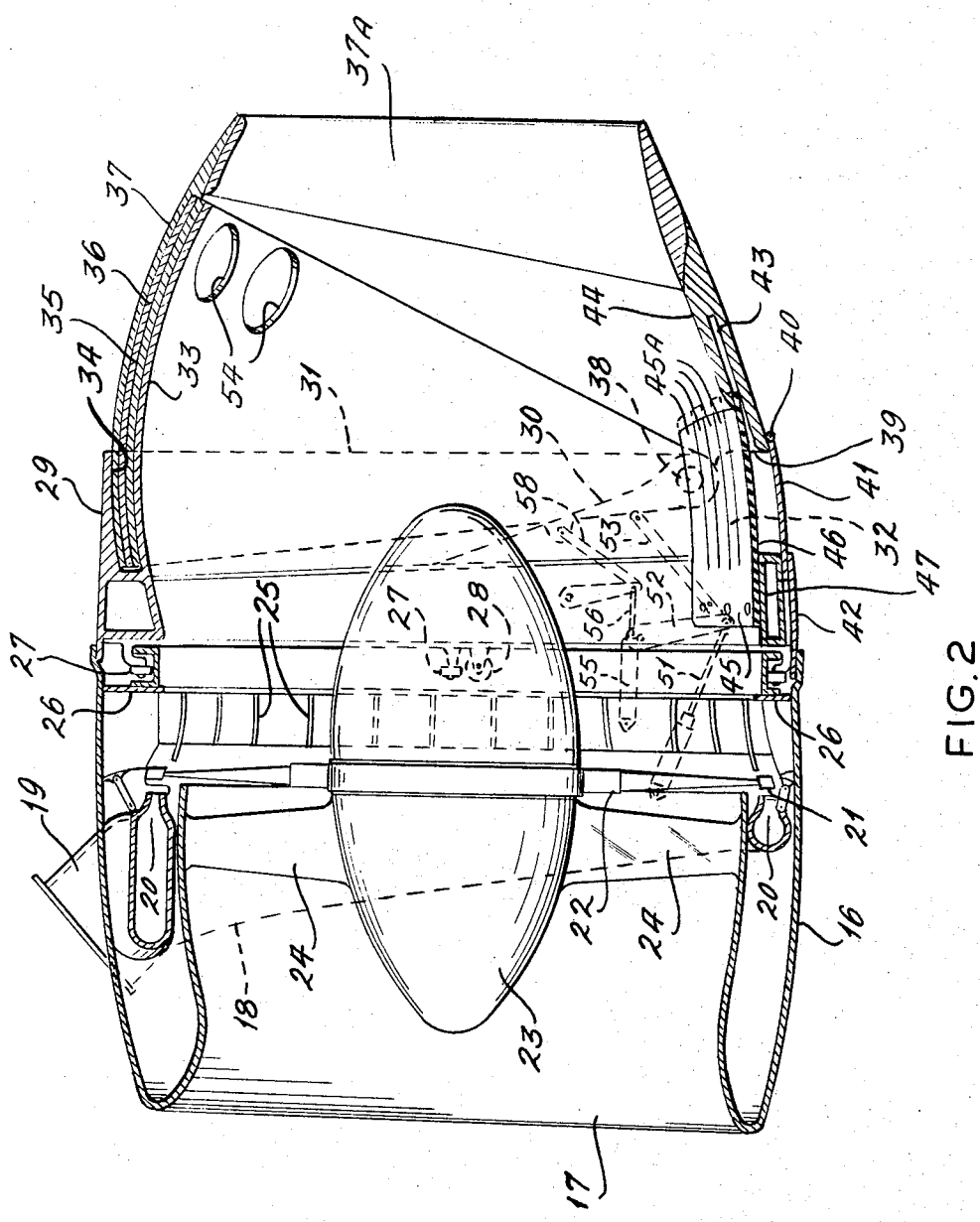
FIG. 2 is a longitudinal sectional view of one of the nozzle assemblies of FIG. 1.

In FIG. 2, which is a longitudinal sectional view of one fan and nozzle assembly operatively carried in the nacelle 16, the main body of the nacelle carries the jet engine exhaust gas scroll 18 connected to the inlet header 19 for directing the gas flow from the jet engine into the scroll. The scroll 18 has outlets 20 directed across the tips 21 of a multi-bladed turbofan 22. The turbofan 22 is operatively carried by the plug member 23 which houses a suitable bearing assembly in the usual manner. Plug 23 is fixed in the nacelle 16 on supporting arms 24 forward of the fan plane, and aft of the fan plane flow straightening vanes 25 surround and carry the aft portion of the plug 23.

The nacelle 16 carries a bearing ring 26 which supports a plurality of rollers 27 and 28 for rotatably mounting the trailing portion 29 of the nacelle which carries the hoods and bucket members of the nozzle assembly.

Still referring to FIG. 2 the portion 29 of the nacelle is a circular ring member on which are mounted at each side a hinge bracket 30 with both brackets located inside the contour of the nacelle. The portion 29 of the nacelle 16 has a trailing lip 31 which is notched at 32 below the brackets 30, the notch opening across the width of the nacelle along a chord thereof. In the manner shown, the portion 29 of the nacelle carries an innermost fixed hood 33 which defines the inner surface of a circular pocket 34 for the nested reception of movable hoods 35 and 36 and the nozzle bucket member 37. Each hood 35 and 36 and the bucket 37 is pivotally connected to the brackets 30 at the pivot elements 38. The hoods 33, 35 and 36 are generally open in a chordal direction across the span of the pivot brackets 30, but the bucket member 37 is a complete circular member having a relief edge 39 which curves across the bottom span of the nacelle portion 29. It, also, is provided with a hinge member 40 which supports a similarly shaped external gullet member 41 extending forwardly to slide in the lower portion 42 of the nacelle 16. The gullet 41 curves upwardly at each side to close the gap space below the brackets 30 and form a streamlined closure for this area of the nacelle. The gullet thereby slides in and out on the nacelle portion 42.

The nozzle bucket member 37 has (FIGS. 2 and 5) an airfoil shape around its outlet portion. This portion is formed with a pocket 43 covered by a web 44 for the reception of an internal or inner gullet member 45 which is fixed at its forward end 46 to the inner wall 47 of the nacelle portion 29. The inner gullet 45 is composed of a plurality of adjacent and overlapping strips 45A which are free to bend and slide over each other during the retraction and pivoted extension of the bucket 37. These strips 45A slide relative to the walls of the pocket 43. In this manner the interior of the nozzle assembly across the chordwise span of the pivot brackets 30 is given a smooth interior surface by the inner gullet 45. The exterior of the nacelle 16 in the hinge area is streamlined by the exterior gullet member 41. The action of the gullets 41 and 45 may be understood by comparing FIGS. 2 and 5.

Figure 3:
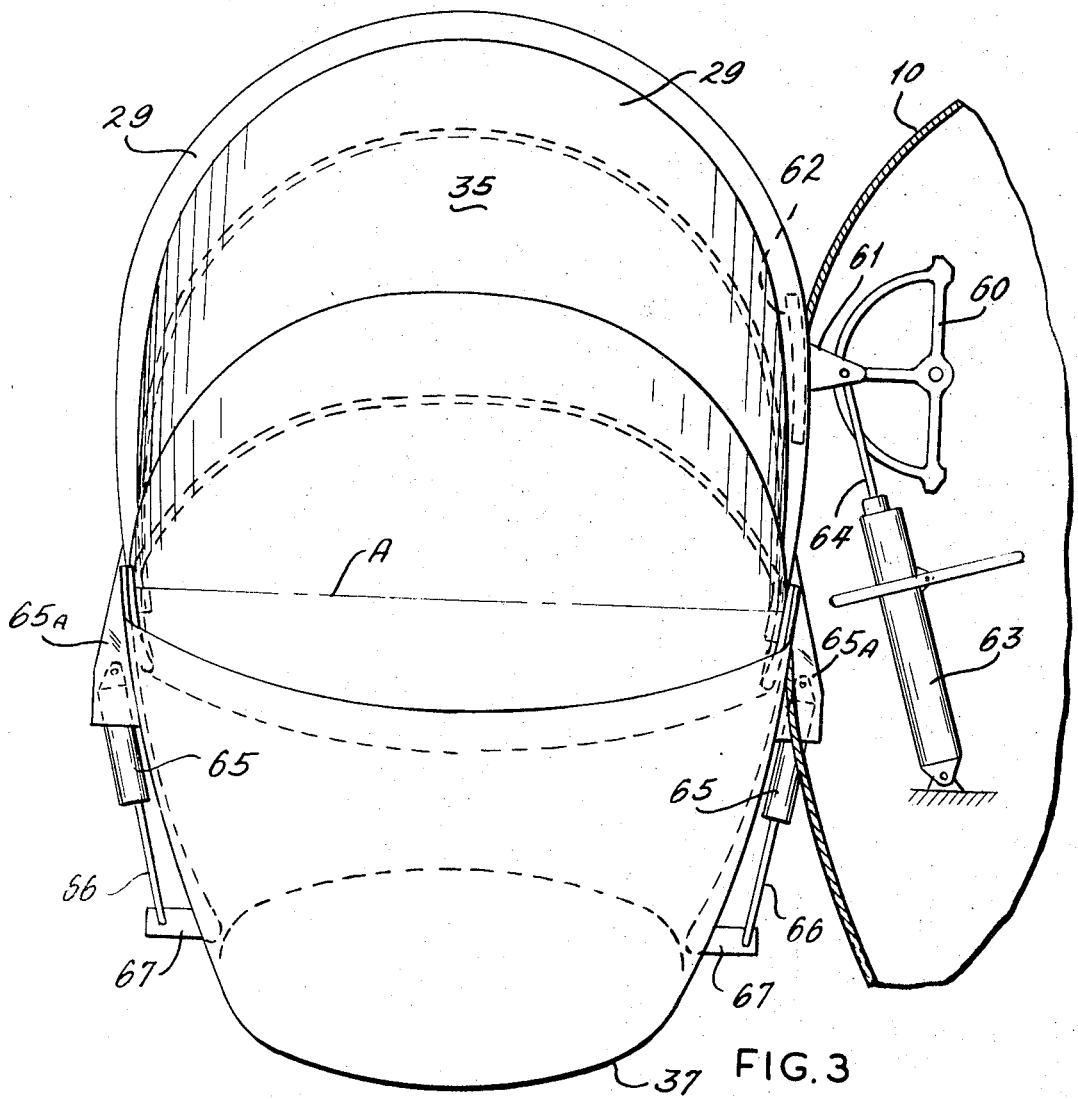
FIG.3 is a fragmentary and schematic view similar to FIG. 4 showing the means for adjusting the positions of the nozzle exhaust ring.

FIG. 2 shows the screw jack actuator 50 having its actuator arm 51 pivotally connected to an idler arm 52 and to an extension-retraction link 53. The link 53 is pivotally connected to a tab at one side of the inner edge of the nozzle bucket 37. While only one actuator 50 and its system of lines may be seen, there may be two such systems for retracting and extending the bucket 37 to provide for redundancy. In FIG. 3 the actuator 50 is fully extended in order to extend the nozzle 37 to a position for reverse thrust operation. In FIG. 2 the screw jack actuator is shown retracted so that the nozzle bucket 37 is retracted into the cruise position. In retracting the bucket 37, the hoods 36 and 35 are picked up and retracted into the nested configuration shown in FIG. 2.

Figure 5:
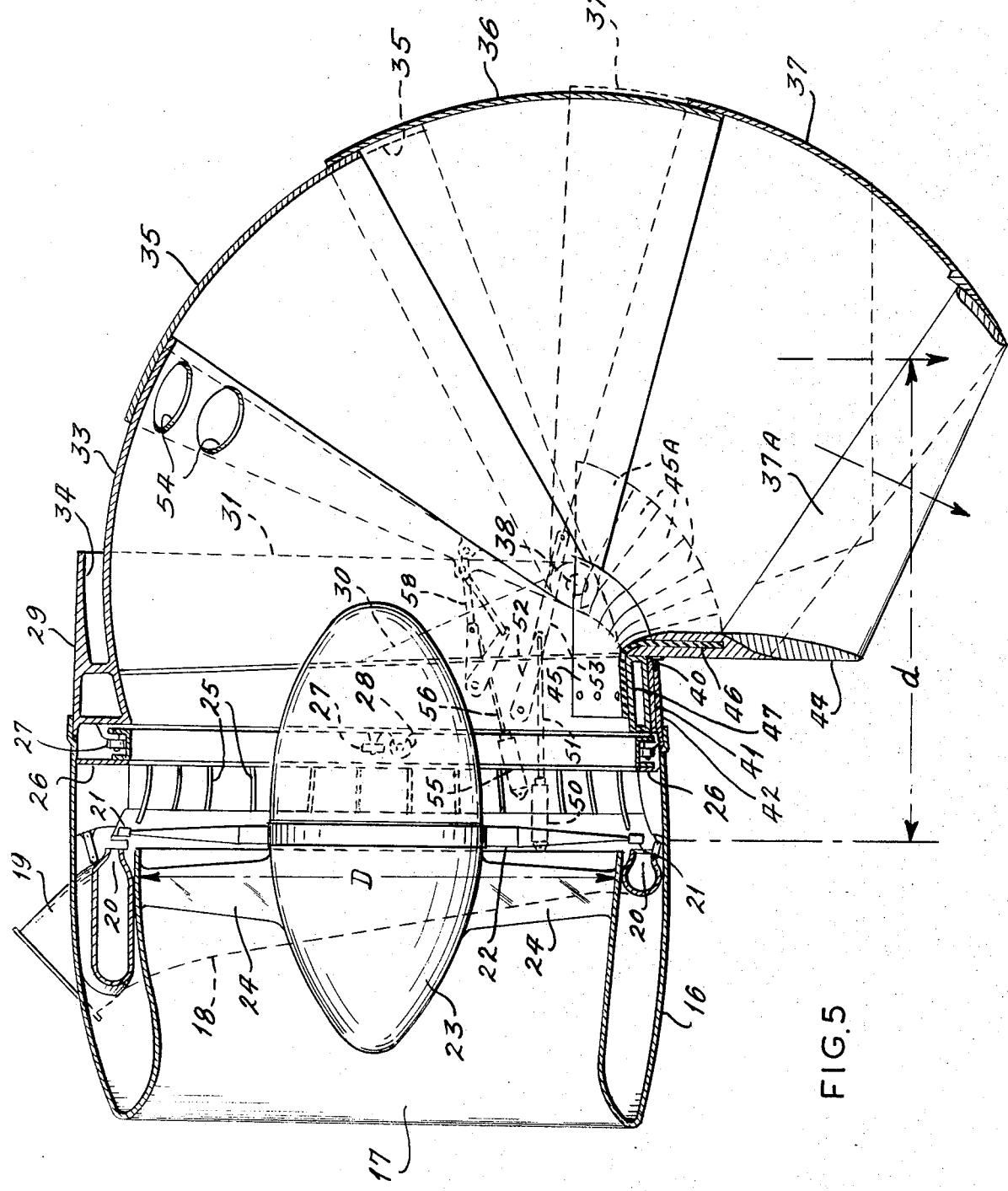
FIG. 5 is a longitudinal sectional view of the nozzle assembly of FIG. 2, but with the hinged hood members rotated or extended into the lift mode seen in FIG. 1.

One of the features of the nested toroidal nozzle hoods is seen in FIGS. 2 and 5 where the fixed hood 33 is provided with a plurality of thrust spoiler apertures 54, with two being seen. In this arrangement a screw jack actuator 55 has its arm 56 pivotally connected to an idler arm 57 and to an actuation link 58, with link 58 being connected to a tab on the inner edge of the hood 35. A pair of actuators 55 and associated arms and links are employed to obtain smooth control of the hood 35. When it is desired to open the spoiler apertures, actuator 55 is energized to swing the hood 35 from its full line position in FIG. 5 to its dotted line position. Normally the screw jack actuators 50 and 55 operate together when extending and retracting the hoods and nozzle, while the actuator 55 may be operated independently for obtaining the spoiler function.

The control system for the nozzle assembly is seen in FIGS. 3, 4 and 6, wherein the fuselage 10 is provided with a control sector member 60 operatively mounted in the fuselage by which the control forces are transferred from the fuselage into the nacelle 16. Adjacent sector 60 is an arm 61 which projects into the fuselage 10 from a bracket 62 mounted on the nacelle portion 29. An actuator cylinder 63 in the fuselage 10 has its operating arm 64 connected to the bracket arm 61. When the cylinder is energized the nacelle portion 29 may be rotated on bearings 27 ]nd 28 (FIGS. 2 and 5) relative to the wixed portion 16 for directing the thrust of the nozzle bucket 37 angularly relative to a vertical thrust vector, thereby introducing yaw control. When yaw control is utilized, the sector member 60 swings or rotates a like amount so that the control lines compensate for the rotation of the nacelle portion 29.

FIGS. 3 and 4 show the arrangement for actuating the movable nozzle exit ring 37A which is disposed within the nozzle bucket 37. The bucket 37 is provided at each side with fairing blisters 65A which cover the brackets for pivotally anchoring the inner ends of actuators 65. The thrust rods 66 of the actuator 65 are connected to arms 67 which move in suitable slots in the nozzle bucket. Arms 67 are fixed to the nozzle ring 37A. Actuators 65 are spring loaded into extended positions for positioning the nozzle ring 37A at the bucket exit, and are retracted by air under pressure from a flexible supply line 68. The line 68 extends into the hinge axis A (FIG. 4) of pivots 38 and from each end of the hinge axis a connecting conduit 69 runs out to the actuators 65 to supply pressure air for retracting the nozzle ring 37A during vertical thrust or V/STOL operation. The retraction of the ring 37A open the nozzle exhaust which is desired. The nozzle exit area variations match the exhaust internal pressure with the external static pressure, and it also accounts for the differences in internal losses between the hover and cruise configurations.

FIG. 6 shows the sector member 60 having tandem motor drive means 70 for independently driving shafts 71 and 72 respectively in the diametral arm of the sector. The outer ends of the shafts have bevel gears in the gear boxes 73 and 74, and the bevel gears drive meshing bevel gears at the power input ends of flexible torque shafts 75 and 76. The latter shafts are paid out and pulled in by the rotational displacement of sector member 60. Torque shaft 76 extends to a transfer gear box 77 for transmitting torque driving power to a pair of flexible, torque shafts 78 and 79 which extend around in the nacelle portion 29. The shaft 75 is long enough to extend to the outside screw jack actuator 55 for moving the hood 35. The short shaft 79 extends to the inside actuator 55. In like manner, torque shaft 75 connects to a gear box 80 from which a long shaft 81 extends to the outside screw jack actuator 50, and a short shaft 82 connected with the inside actuator 50.

SUMMARY OF THE DISCLOSURE

The improved thrust vectoring apparatus above described has its forward or inlet portion of the nacelle 16 fixed to the aircraft fuselage 10. The forward portion of the nacelle supports the aft or outlet portion 29 of the nacelle. It has been pointed out that the outlet portion 29 may be rotated relative to the fixed inlet portion for introducing yaw control vectoring of the thrust developed by the fluid flow through the duct defined in the nacelle. The view of FIG. 2 shows the vectoring apparatus in normal aircraft cruise flight condition. FIG. 5 shows the selective positioning of the thrust vectoring apparatus for obtaining thrust to maintain vertical operation of the aircraft. The full line position of the vectoring apparatus in FIG. 5 is obtained when it is desired to exert reverse thrust for stopping the aircraft during landing. The broken outline, on the other hand, is the position of the thrust vectoring apparatus for initiating vertical take-off or for obtaining hovering characteristics. Positions of the thrust vectoring apparatus between those shown in FIGS. 2 and 5 will be understood for carrying out the transition between the vertical take-off and horizontal cruise flight operation.

The structure shown in FIGS. 2 and 5 includes the portion 29 of the nacelle 16 which supports the pivot brackets 30 at the lower outer sides of the circular configuration for the portion 29. The brackets 30 at each side establish a linear pivot axis which is a chord of the circle defined by the portion 29. The fixed hood 33 of the outlet portion 29 is circular but is notched out at 32 near the pivot brackets 30 and across the chordal space between the brackets 30. The fixed hood 33 is also circular in the plane of the drawing and defines a diffusion chamber aft of the plug 23 and within the volume of the outlet duct under the fixed hood 33. The respective movable hood members 35 and 36 are similarly shaped to form a circular cross-section opposite the axis of the pivot forming means 38, and between the pivot brackets. These hoods are flattened to accommodate the installation of an internal gullet 45 consisting of a suitable plate having its trailing portion slit longitudinally of the duct providing a plurality of adjacent and overlapping strips 45A. The flattened lower edges of the hoods 35 and 36 move under the internal gullet 45. The gullet 45 and its several strips 45A bridge the gap area and form a smooth surface for the flow of fluid. The nozzle bucket 37 is pivoted on brackets 30 by the pivot 38 so that the pivot axis is located within the nacelle portion 29. This construction permits the vectoring apparatus to position the nozzle ring 37A carried by the nozzle bucket 37 in a position to direct the axis of the downward thrust a distance (d) aft of the plane of the fan 22, a distance equal to or slightly less than the diameter (D) of the duct in front of or adjacent the fan 22. The structure of the vectoring apparatus eliminates a large portion of the structure thought necessary in connection with apparatus for vectoring the thrust of a flow moving at velocity necessary for aircraft propulsion proportions. The compactness of the apparatus is achieved as a result of placing the pivot axis well within the outline of the exit portion 29 of the nacelle and an important weight saving maximum nozzle efficiency.

In addition to the internal gullet 45 with its overlapping strips 45A, the apparatus is provided with an external gullet 41 which maintains the exterior of the nacelle 16 highly streamlined. In this construction the gullet 41 is a flat sheet which is flattened across the width of the nacelle between the pivot brackets 30 and is curved upwardly at each end. In the flattened lower portion the gullet plate 41 is provided with a hinge 40 connected to the adjacent portion of the nozzle bucket 37. When connected in this manner the gullet plate 41 is adjacent to slide on the surface 42 of the outlet portion 29 of the nacelle.

Turning now to FIGS. 3 and 4, the thrust apparatus is shown with its thrust vectoring means in the position of FIG. 3 so that the thrust is turned downwardly between hoods 35 and 36 and nozzle bucket 37. The bucket 37 is provided with a movable nozzle ring 37A, adjustably positioned by actuators 65 which are spring loaded to hold the nozzle ring 37A in the position shown in FIG. 5. In order to retract the nozzle ring 37A, air under pressure (FIG. 4) is supplied through a flexible conduit 68 to swivel units on the axis A of the hinge means 38 for transferring the flow of air to other distributor conduits 69. The conduits 69 then carry the air to the respective actuators 65 for retracting the nozzle ring 37A into the bucket 37 when the thrust vectoring apparatus is in the V/STOL mode. Normally in cruise flight the nozzle ring 37A is allowed to seek its aft position in the nozzle bucket 37.

The vectoring apparatus is capable of having its portion 29 rotated relative to the nacelle 16 by means of the actuator 63 having its arm 64 connected to the arm 61 of a bracket 62 fixed to the ring portion 29. When the actuator is extended or retracted from the position shown in FIGS. 3 or 4 the thrust issuing from the nozzle ring 37A or the bucket 37 is angularly diverted so as to function as a means for introducing or controlling the yaw flight characteristics of the aircraft. During the angular turning of the ring 29, control lines passing from the fuselage 10 into the nacelle 16 must accommodate the rotation and this is achieved by means of the sector 60 which moves about a central pivot and controls the in and out positioning of the control lines.

FIG. 6 shows the driving arrangement for the screw jacks 50 and 55 which are provided for extending and retracting the movable hoods 35 and 36 and the nozzle bucket 37 in order to accommodate the angular motion for yaw control. It should be clearly understood now that the flexible drive shafts 75 and 76 are on opposite sides of the sector 60 and crossover as they pass into the nacelle ring portion 29. Once within the ring portion 29, drive transfer gear boxes 77 and 80 are provided to simultaneously drive torque shafts 78 and 81, and 79 and 82 respectively. These shafts are, in turn, connected to the screw jacks 55 and 50.

The thrust vectoring apparatus, as above described, fulfills the need for efficient, uninterrupted vectoring of thrust for vertical or short take-off aircraft. The nested toroidal configuration of the hoods and nozzle buckets permits obtaining utmost efficiency by making it possible to integrate the lift and cruise propulsion system through utilizing the same thrust unit for both modes. It is a particularly important factor of the present apparatus to obtain vertical thrust in a very short distance aft of the plane of the fan so that the apparatus is both compact and lightweight and provides for a clean aerodynamic assembly, both externally and internally. The configuration of the fixed and movable hoods provides ] diffuser chamber which minimizes pressure loss during the vertical vectored operational mode for lift, as well as in the conventional cruise operational mode.

Still another and important feature of the present apparatus is the forming of the hoods and nozzle bucket for sustaining the loads for reaction in hoop tension. The circular configuration is rendered possible because of the internal and external gullet structure that permits rotating the hoods about an axis within the outline of the nacelle rather than about an axis external to the nacelle. The nested and circular configuration of the hoods and nozzle bucket permits these components to extend or retract by traveling through an arc smaller than the diameter of the nacelle 16. The circular cross-section thereof provides good internal flow characteristics as well as taking the primary loads in tension, which will then allow the obtaining of excellent strength without an excess of structural mass. It is to be observed that the exit plane of the nozzle ring 37A is a substantially complete circle making an efficient nozzle.

In its overall importance, the internal shape of the several components provides an efficient diffuser minimizing internal pressure loss consistent with obtaining good performance and avoiding excessive length of structure. Elongated structure increases drag and flow disturbances that would reduce the net thrust available. The power for driving the fan 22 is obtained in this disclosure by directing the exhaust from the jet engine 15 into a header 19 which is adapted to divide the flow of hot gases so that each column travels substantially 180° of the full circle of the gas scroll 18. The energy of the hot gases is directed by nozzle 20 across the vanes 21 mounted on the tip portion of the blades of the fan 22.

It should now be appreciated in what manner the thrust vectoring apparatus achieves the objects and advantages described above. It should be understood that the organization of the several components result in an efficient thrust vectoring apparatus requiring a minimum of structural mass to sustain the thrust loads exerted during aircraft operations. While the present disclosure has been presented in connection with application of thrust vectoring apparatus to aircraft propulsion systems, it must not be overlooked that the apparatus may be used for vectoring a fluid flow for other purposes.

What is claimed is:

1. Apparatus for vectoring a fluid flow comprising a fluid flow impelling fan, a duct surrounding said fan for confining the fluid flow and having a predetermined diameter, pivot forming means mounted within the outline limits of said duct aft of said fan, fluid flow vectoring means mounted on said pivot means and being constituted by hood means forming a passage enclosing the fluid flow, said hood means being movable between a first position directing the fluid flow in a thrust direction aft of said duct and substantially in axial alignment with the fan axis and a second position directing the total fluid flow in a thrust direction at an angle relative to said fan axis, said thrust in said second position having a thrust axis located aft of said fan a distance substantially equal to or less than said duct diameter.

2. The apparatus set forth in claim 1 wherein said hood means of the flow vectoring means is movable into a third position beyond said second position relative to said first position, said third position directing the flow in a direction with a flow component directed reverse to that of said first position.

3. Apparatus for vectoring a fluid flow comprising a fluid flow impelling fan, a duct surrounding said fan for confining the fluid flow and having a predetermined diameter, pivot forming means mounted in said duct aft of said fan, fluid flow vectoring means mounted on said pivot means and movable between a first position directing the fluid flow in a thrust direction aft of said duct and substantially in axial alignment with the fan axis and a second position directing the total fluid flow in a thrust direction at an angle relative to said fan axis, said flow vectoring means including a fixed hood enclosing said pivot means, a movable hood mounted on said pivot means and a toroidal nozzle bucket movable mounted on said pivot means and cooperating with said hoods to confine the fluid flow through said hoods and bucket, said movable hood and bucket being nested in overlapped position when in said first position and being extended in projection of each other in said second position, and said thrust in said second position having a thrust axis located aft of said fan a distance substantially equal to or less than said duct diameter.

4. The apparatus set forth in claim 3 wherein said flow vectoring means is movable into a third position beyond said second position relative to said first position, said third position directing the total flow in a direction with a flow component directed reverse to that of said first position.

5. Apparatus for vectoring a fluid flow comprising a fluid flow impelling fan, a duct surrounding said fan for confining the fluid flow and having a predetermined diameter, pivot forming means mounted in said duct aft of said fan, fluid flow vectoring means mounted on said pivot means and movable between a first position directing the fluid flow in a thrust direction aft of said duct and substantially in axial alignment with the fan axis and a second position directing the total fluid flow in a thrust direction at an angle relative to said fan axis, said flow vectoring means including a fixed hood enclosing said pivot means at its lower side, a movable hood cooperating with said fixed hood to direct the fluid flow, one of said hoods being provided with flow spoiling outlet means and said hoods being relatively movable such that the flow spoiling outlet means may be selectively opened to spoil the flow and closed to cut off flow through said opening, and said thrust in said second position having a thrust axis located aft of said fan a distance substantially equal to or less than said duct diameter.

6. Apparatus for vectoring a fluid flow comprising a fluid flow impelling fan, a duct surrounding said fan for confining the fluid flow and having a predetermined diameter, pivot forming means mounted in said duct aft of said fan, fluid flow vectoring means mounted on said pivot means and movable between a first position directing the fluid flow in a thrust direction aft of said duct and substantially in axial alignment with the fan axis and a second position directing the total fluid flow in a thrust direction at an angle relative to said fan axis, said flow vectoring means including a hood fixed on said duct aft of said fan and enclosing said pivot forming means, said fixed hood having a substantially circular configuration and being provided with flow spoiler apertures, movable hood means mounted on said pivot forming means and cooperating with said fixed hood, a toroidal nozzle bucket movable mounted on said pivot forming means and cooperating with said fixed hood and movable hood means, and means operably connected to said nozzle bucket and movable hood means to pivot the same between said first and second positions, said movable hood being movable independently to cover and uncover said flow spoiler apertures and said thrust in said second position having a thrust axis located aft of said fan a distance substantially equal to or less than said duct diameter.

7. The apparatus set forth in claim 6 wherein said operable means moves said nozzle bucket and hood means into a third position in which said nozzle bucket develops thrust with a component in a direction reverse to the normal direction of flow when in said first position.

8. In an aircraft having a jet propulsion engine the improvement of means operable to apply the exhaust flow of said jet engine to powering the flight of the aircraft in normal cruise flight and in vertical take-off and landing flight, said improved means including a flow directing duct having inlet and outlet portions normally in axial alignment for cruise flight, a flow impelling fan in said duct inlet portion, flow directing nozzle means pivotally mounted in said duct outlet portion for movement between positions in which the outlet flow is directed selectively at an angle to the normal axis of said duct, wherein the mounting of said nozzle means comprises pivot means disposed within the outline of said duct outlet portion, gullet means covering said pivotal mounting of said nozzle means to reduce flow disturbances, said gullet having a portion fixed to one of said duct outlet portions or nozzle means and a portion slidably in contact with the other one of said duct or nozzle means, and means to apply the jet engine exhaust flow to driving said fan.

9. The improvement set forth in claim 8 wherein said outlet portion of said flow directing duct is rotatable about the axis of alignment of said inlet and outlet portions and relative to said inlet portion whereby said duct outlet portion and nozzle means in said selective angular positions are effective for aircraft yaw control.

10. The improvement set forth in claim 8 wherein said duct inlet portion adjacent said fan has a predetermined diameter, and said nozzle means is mounted in said duct outlet portion for movement about an axis located aft of said fan a distance substantially equal to or less than said duct predetermined diameter.

11. The improvement set forth in claim 8 wherein said nozzle means includes a nozzle bucket and hood means movable about a common pivot axis, separate means operatively connected to said bucket and hood means to move said bucket and hood means into said flow directing positions, said separate means connected to said bucket being operable to modulate the position of said bucket independently of said hood means.

12. In an aircraft having a jet propulsion engine the improvement of means operable to apply the exhaust flow of said jet engine to powering the flight of the aircraft in normal cruise flight and in vertical take-off and landing flight, said improved means including a flow directing duct having inlet and outlet portions normally in axial alignment for cruise flight, a flow impelling fan in said duct inlet portion, flow directing nozzle means pivotally mounted in said duct outlet portion for movement between positions in which the outlet flow is directed selectively at an angle to the normal axis of said duct, said flow directing nozzle means including a series of hoods of circular configuration and sized to fit together in nested relation to direct the flow along the normal axis for cruise flight and to swing outwardly from each other about a common axis located within the outline of the assembly to direct the flow at an angle to the normal axis for cruise flight, one of said series of hoods defining a diffuser chamber and being fixed to said duct outlet portion and means to apply the jet engine exhaust flow to driving said fan.

13. The improvement set forth in claim 12 wherein said duct outlet portion has circular configuration with a fixed circular hood extending in the direction of the outlet flow, said hood being notched along its lower side, pivot brackets carried by said duct outlet portion within said hood and adjacent said hood notch, said flow directing nozzle means being supported from said pivot brackets and gullet means operatively spanning the zone of the pivot connection between said nozzle means and said pivot brackets.

14. The improvement set forth in claim 13 wherein said gullet means includes an internal gullet exposed to the flow through said duct outlet portion, and an external gullet exposed to ambient flow.

15. The improvement set forth in claim 14 wherein said internal gullet includes a preformed sheet to fit the circular contour of said duct outlet portion, and a plurality of strips extending over said pivot zone, said strips being operable to adjust positions across the chordal width of said duct covered by said sheet, and said sheet and strips being flexible.

16. A deflector apparatus for a gas stream normally flowing axially through a tubular duct having a plurality of gas stream direction controlling means operably mounted on said duct for movement between stored position in nested relation without deflecting the gas stream axial flow and a gas stream deflecting position with said means extended, said flow deflector apparatus comprises pivot means carried in the duct and extending along a chord at one side of the gas stream, a plurality of gas flow direction controlling means, means operably connecting said plurality of direction controlling means to said pivot means, and flexible gullet means bridging the pivot means at one side of the gas stream, said flexible gullet means assuming a position within the duct to smooth the gas stream flow in the zone of said pivot means carried in said duct.

17. The improvement of claim 16 wherein said gullet means has a portion fixed to one of said duct and direction controlling means and a portion slidably in contact with the other one of said duct and direction controlling means.

18. Apparatus for vectoring a fluid flow comprising a fluid flow impelling fan, a duct surrounding said fan to confine the fluid flow normally to a path substantially axially aft of said fan, flow confining hood means carried by said duct aft of said fan, said hood means having a notched portion along its lower side, pivot brackets carried by said duct within said duct and adjacent said hood notched portion, and other hood means operatively mounted on said pivot brackets and cooperating with said first mentioned hood means to form a flow directing nozzle having a first position corresponding to said normal path of fluid flow axially aft of said fan and having a second position in which the hood means have portions movable into said notched portion and cooperate to define a passage diverting the fluid flow at an angle to said normal axial path.

* * * * *